United States Patent [19]

Islam et al.

[11] Patent Number: 6,115,712
[45] Date of Patent: Sep. 5, 2000

[54] MECHANISM FOR COMBINING DATA ANALYSIS ALGORITHMS WITH DATABASES ON THE INTERNET

[75] Inventors: Nayeem Islam, Yorktown Heights; Vineet Singh, White Plains, both of N.Y.

[73] Assignee: International Business Machines Corporation, Armonk, N.Y.

[21] Appl. No.: 08/678,924

[22] Filed: Jul. 12, 1996

[51] Int. Cl.⁷ .................................................... G06F 17/30
[52] U.S. Cl. .................................. 707/10; 707/1; 707/3; 707/102; 706/10; 706/42
[58] Field of Search .......................... 707/1, 3, 10, 102; 704/104; 706/42, 10; 395/183.02; 399/42

[56] References Cited

U.S. PATENT DOCUMENTS

| | | | |
|---|---|---|---|
| 4,584,639 | 4/1986 | Hardy | 364/200 |
| 5,058,042 | 10/1991 | Hanna et al. | 364/522 |
| 5,251,205 | 10/1993 | Callon et al. | 370/60 |
| 5,446,896 | 8/1995 | Hegarty et al. | 395/650 |
| 5,694,549 | 12/1997 | Carlin et al. | 395/200.2 |
| 5,727,950 | 3/1998 | Cook et al. | 434/350 |
| 5,754,938 | 5/1998 | Herz et al. | 455/4.2 |
| 5,809,492 | 9/1998 | Murray et al. | 706/45 |
| 5,832,208 | 11/1998 | Chen et al. | 395/187.01 |
| 5,835,087 | 11/1998 | Herz et al. | 345/327 |
| 5,838,316 | 11/1998 | Arruza | 345/334 |
| 5,862,325 | 1/1999 | Drummond et al. | 395/200.31 |
| 5,867,799 | 2/1999 | Lang et al. | 707/1 |

FOREIGN PATENT DOCUMENTS

0718784A1  12/1995  European Pat. Off. ................... 17/30

OTHER PUBLICATIONS

Richard Scoville, "Find it on the net," PC World Online, pp, 1–8, Jan. 1996.

Neil Randall, "The Search Engine that could," ZDNet, pp, 1, Jan. 1995.

Decision Maker, "Info, where are you," ZDNet, pp, 1–2, Jan. 1995.

Daniel Dreilinger, "About SavvySearch," pp, 1–4, Jan. 1995.

"Hide and Go Seek," ZDNet, pp, 1–3, Jan. 1995.

J. G. Tyler, "User–Sensitive Multimedia Presentation System", IBM Technical Disclosure Bulletin, vol. 39, No. 03, Mar. 1996.

R. C. Hauser et al., "Security for Routing Based on Link State Algorithms", IBM Technical Disclosure Bulletin, vol. 39, No. 03, Mar. 1996.

Primary Examiner—Hosain T. Alam
Assistant Examiner—Jean M Corriélus
Attorney, Agent, or Firm—Heslin & Rothenberg, P.C.

[57] ABSTRACT

An open architecture for arbitrarily combining data analysis algorithms and databases on the Internet where the data analysis algorithm and database may be from different vendors or suppliers. At the request of a customer, the two are combined on the fly while maintaining proper security and while enforcing some agreed upon payment from the customer to both the algorithm and database suppliers. In one embodiment, a message including an identifier of a user selected independent content provider and an identifier of a particular service associated with a service provider is sent to the service provider on a communication network. The user selected independent content provider is separate from the service provider. In response to the message, a computer executable code, which when executed by the content provider will cause the particular service to be performed against content controlled by the content provider, is sent from the service provider to the content provider. The computer executable code is executed by the content provider and at least partial results of the executing is returned to the user by way of the communication network.

40 Claims, 6 Drawing Sheets

MECHANISM FOR COMBINING DATA ANALYSIS ALGORITHMS WITH DATABASES ON THE INTERNET

1 FIELD OF INVENTION

This invention is related to computers and computer systems and particularly to a method and system for use of the world wide web and Internet. It provides a mechanism for combining data analysis algorithms and databases on the Internet.

2 RELATED APPLICATIONS

The present invention is related to the following co-pending United States of America patent applications: Ser. No. 08/655,138, entitled "System and Method for Generating Trusted Descriptions of Information Products", by D. Chess, filed May 30, 1996, U.S. Pat. No. 6,026,374; Ser. No. 474,571, entitled "Computer Network for WWW Server Data Access over Internet", by Lagarde et al., filed Jun. 7, 1995, U.S. Pat. No. 5,721,908; and U.S. patent application Ser. No. 08/661,687 "A Uniform Mechanism for Using Signed Content," by Anand et al., filed Jun. 11, 1996, now abandoned. These co-pending applications are commonly assigned to the assignee of the present invention, and are hereby incorporated by reference in their entirety.

3 GLOSSARY OF TERMS

Internet
   The network of networks and gateways that use the TCP/IP suite of protocols.
Client
   A client is a computer which issues commands to the server which performs the task associated with the command.
Server
   Any computer that performs a task at the command of another computer is a server. A Web server typically supports one or more clients.
World Wide Web (WWW or Web)
   The Internet's application that lets people seeking information on the Internet switch from server to server and database to database by clicking on highlighted words or phrases of interest (hyperlinks). An Internet WWW server supports clients and provides information. The Web can be considered as the Internet with all of the resources addressed as URLs and which uses HTML to display the information corresponding to URLs and provide a point-and-click interface to other URLs.
Universal Resource Locator (URL)
   A way to uniquely identify or address information on the Internet. Can be considered to be a Web document version of an e-mail address. They can be accessed with a Hyperlink. An example of a URL is "http://www.arun.com:80/table.html". A URL has four components. Starting from the left, the first specifies the protocol to use, separated from the rest of the locator by a ":". Next is the hostname or IP address of the target host; this is delimited by the "//" on the left and on the right by a "/" or optionally a ":". The port number is optional, and is delimited on the left from the hostname by a ":" and on the right by a "/". The fourth component is the actual file name or program name. In this example, the ".html" extension means that this is an HTML file.
HyperText Markup Language (HTML)
   HTML is the language used by Web servers to create and connect documents that are viewed by Web clients. HTML uses Hypertext documents. Other uses of Hypertext documents are described in U.S. Pat. No. 5,204,947, granted Apr. 20, 1993 to Bernstein et al.; U.S. Pat. No. 5,297,249, granted Mar. 22, 1994 to Bernstein et al.; U.S. Pat. No. 5,355,472, granted Oct. 11, 1994 to Lewis; all of which are assigned to International Business Machines Corporation, and which are incorporated by reference herein.
Hypertext Transfer Protocol (HTTP)
   HTTP is an example of a stateless protocol, which means that every request from a client to a server is treated independently. The server has no record of previous connections. At the beginning of a URL, "http:" indicates the file contains hyperlinks.
Internet Browser or Web Browser
   A graphical interface tool that runs Internet protocols such as http, and displays results on the customers screen. The browser can act as an Internet tour guide, complete with pictorial desktops, directories and search tools used when a user "surfs"the Internet. In this application the Web browser is a client service which communicates with the World Wide Web.
HTTP Daemon (HTTPD)
   A server having Hypertext Markup Language and Common Gateway Interface capability. The HTTPD is typically supported by an access agent which provides the hardware connections to machines on the intranet and access to the Internet, such as TCP/IP couplings.
Applet
   Downloadable code fragment.
Applet system
   System that can securely download code and execute it.
Java
   A computer programming language developed by Sun Microsystems for programming on the Internet.
Secure Electronic Transaction (SET) Protocol
   A protocol for doing secure electronic transactions on the Internet to purchase goods or services using credit cards.
Data Analysis Algorithm
   A computer process that analyzes data to infer properties of the data.
Database
   A repository of data or information.

4 BACKGROUND

Traditionally, commercial data analysis services have been offered as a monolithic system in which the data analysis algorithms and database are part of a single system offering. FIG. 1 depicts an example of such a prior art system. As depicted, a customer 900 interacts with the data analysis provider 930, gets results, and is charged some price for the results. The data analysis provider has both the data analysis algorithm 910 and the database to be analyzed 920. Potentially, the system can be implemented as a client-server system where the customer and data analysis provider interact over some network (possibly the Internet or Intranets). It is also possible that the data analysis algorithms and the database were developed by different organizations. However, the data analysis provider that a customer interacts with is a monolithic system. An example is the Lexis-Nexis service which is provided by a division of Reed-Elsevier, Inc.

More recently, another model of data analysis service has become prevalent on the Internet. Here, the data analysis algorithms are supplied by search engines such as Yahoo! (from Yahoo! Corporation) and Alta Vista (from Digital Equipment Corporation). The database is all web pages on the Internet—some of them with relational data but they usually contain unstructured data with text, numbers, figures, images/video, and audio. An index database is constructed either manually or automatically on a periodic basis. Customer requests for information trigger a search of the index database and the customer is pointed to relevant Internet sources. The index and search mechanism taken together constitute a data analysis algorithm. The data analysis algorithm in these search engines are packaged together with the search engine and are not subject to replacement dynamically at the request of the customer. In addition, the search engines and the database are free. Revenue, if any, is generated by advertising related to various web pages generated by the search engines.

Thus, there is a need for a system available on the Internet allowing users to dynamically combine service providers, e.g., of data analysis algorithms with independent content suppliers, e.g., of databases. There is also a need for the system to maintain proper security for the proprietary algorithms and databases, and a pricing mechanism whereby the customer is charged for access to the algorithms and databases. The present invention addresses such a need.

An electronic commerce model, Secure Electronic Transaction (SET), has been proposed by major credit and computer vendors including IBM, Microsoft, VISA and Mastercard. This model will be supported by many entities engaging in commerce on the Internet. For example, IBM's merchant server "Net.Commerce" and cyber shopping district "World Avenue" have announced plans to use SET. See URL http://www.visa.com for more details on SET.

5 SUMMARY

The present invention is directed to an open architecture for securely combining data analysis algorithms and databases on the Internet where the data analysis algorithm and database may be from different vendors or suppliers.

According to one aspect of the present invention, a computerized method for providing services over a communication network, comprises the steps of: sending a service provider on the network a message including an identifier of a user selected independent content provider and an identifier of a particular service associated with the service provider; in response to the message, sending from the service provider to the content provider, a computer executable code which when executed by the content provider will cause the particular service to be performed against content controlled by the content provider; executing the computer executable code by the content provider; and, returning at least partial results of said executing step to the user by way of the communication network.

According to a second aspect of the present invention, the computer executable code specifies one or more computing resources required, which include one of memory, disk, and CPU time, for rendering the particular service.

According to a third aspect of the present invention, the content provider specifies one or more computing resources available, which may include the memory or disk available for rendering the particular service.

According to a fourth aspect of the present invention, the step of executing further comprises the step of constraining communications by the computer executable code to an application associated with the content executed against.

According to a fifth aspect of the present invention, the network is the Internet and the service provider, content provider, and the user are communicating with Java enabled machines and the computer executable code is a Java applet (downloadable code fragment).

A sixth aspect of the present invention comprises the step of billing the user based on one or more of the particular service, the content, and the at least partial results, in response to said returning step.

A seventh aspect of the present invention, includes the step of interactively billing the user for partial results According to an eighth aspect of the present invention, the step of billing the user for partial results interactively is implemented using an electronic commerce model.

An ninth aspect of the present invention includes the step of crediting the content provider for use of the content and the service provider for the use of the service.

According to a tenth aspect of the present invention, the service provider is a data analysis service provider, the content provider is an independent database provider, the service is a particular data analysis algorithm associated with the service provider, and the content is a database controlled by the database provider.

6 BRIEF DESCRIPTION OF THE DRAWINGS

These and other features and advantages of the present invention will become apparent from the following detailed description taken in conjunction with the accompanying drawings, wherein.

7 DETAILED DESCRIPTION

Figure 1:
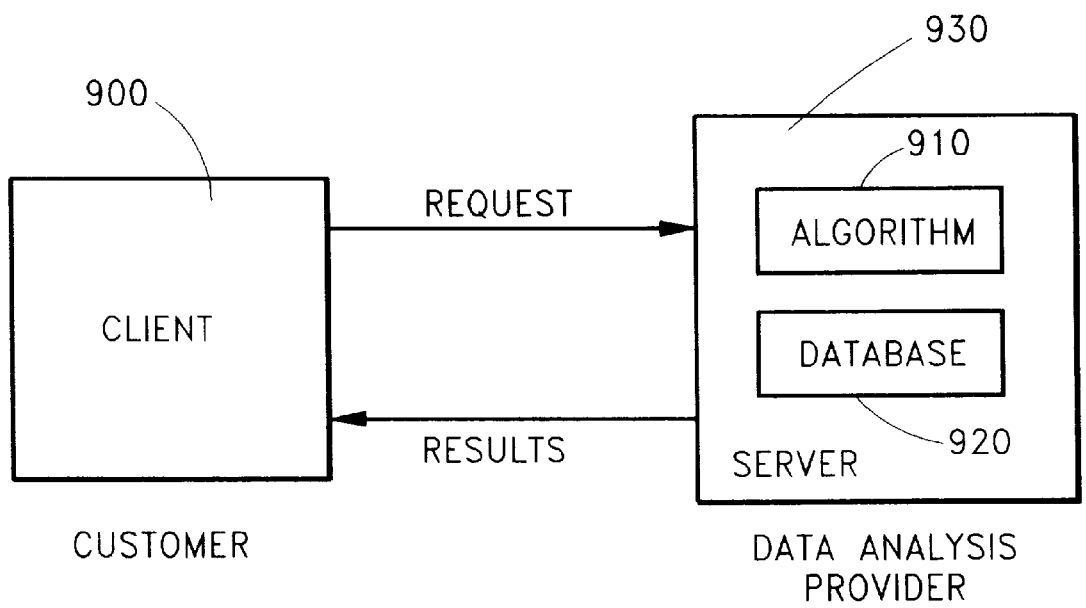
FIG. 1 depicts a prior art system whereby a customer may interact with a commercial data analysis provider.
Figure 2:
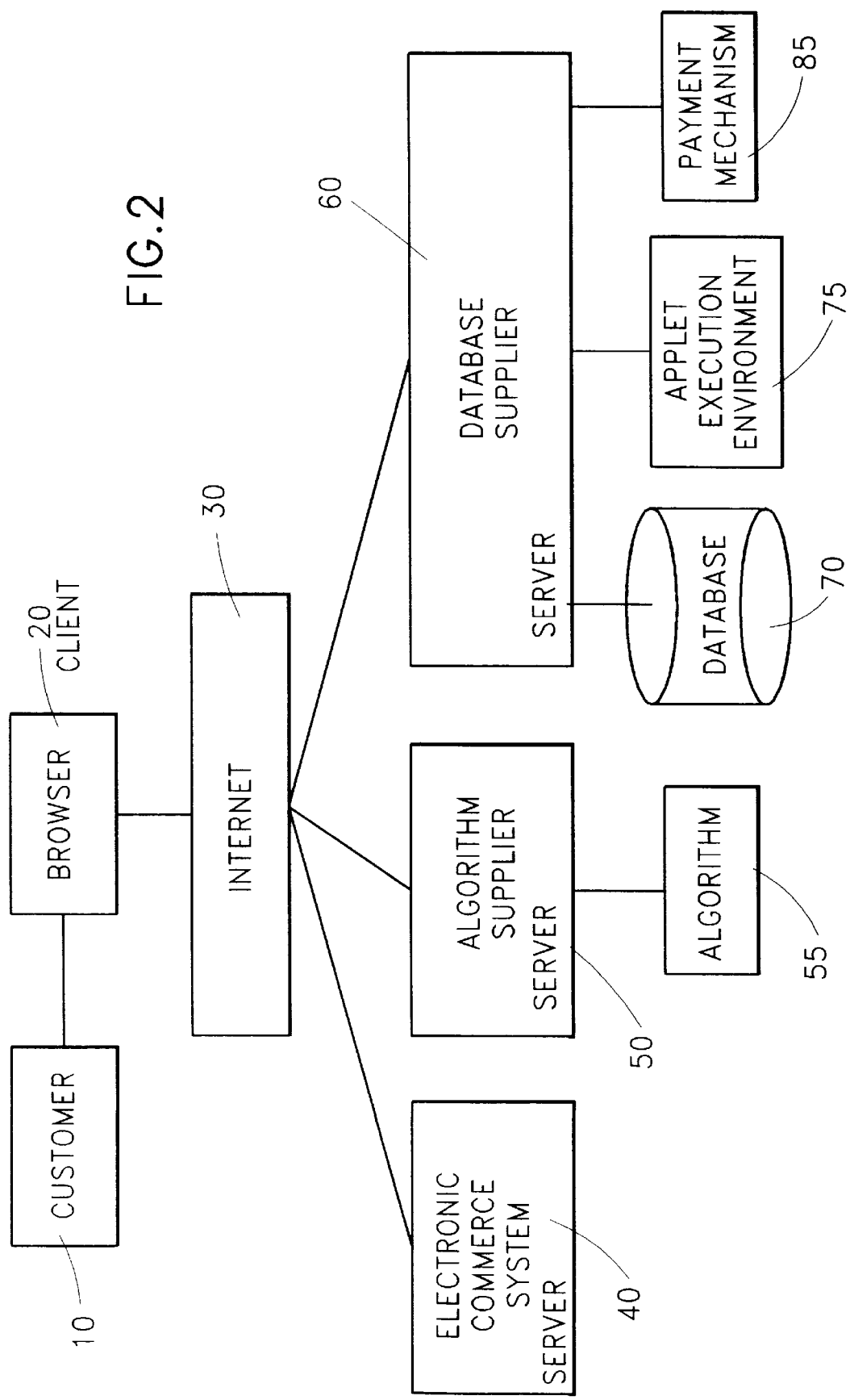
FIG. 2 shows a computer system having features of the present invention.

FIG. 2 depicts a system having features of the present invention for arbitrarily combining computer services such as a data analysis algorithm 55, which may be provided by a data analysis algorithm supplier 50, with a database 70 which is provided by a database supplier 60. Here, a customer (also called a user) 10 uses a client running a browser 20 to access servers 50, 60 via the Internet 30 and the TCP/IP suite of network protocols. Network protocols provide standard methods for machines to communicate with one another. The protocols indicate how data should be formatted for receipt and transmission across networks. Heterogeneous machines can communicate seamlessly over a network via standard protocols. Examples of standard Internet protocols include: HTTP, see, e.g., "Hypertext Transfer Protocol—HTTP/1.0", http://www.ics.uci.edu/pub/ietf/http/draft-ietf-http-v10-spec-03.html, by T. Berners-Lee, R. Fielding, and H. Frystyk, Sep. 4, 1995; SMTP, see, e.g, "Simple Mail Transfer Protocol". RFC 821, J. B. Postel, Information Sciences Institute, USC, August 1982, http://ds.internic.net/std/std10.txt.; and, FTP, see e.g., J. Postel and J. K. Reynolds. "File Transfer Protocol (FTP)", RFC 959, Information Sciences Institute, USC, October 1985, http://ds.internic.net/std/std9.txt. The client-server model constitutes one of the dominant paradigms in network programming, see, e.g., W. R. Stevens, "Unix Network Programming", Prentice Hall PTR, Englewood Cliffs, N.J., 1990; and D. E. Comer, "Internetworking with TCP/IP" vol 1., Prentice Hall, Englewood Cliffs, N.J., 1991 which is hereby incorporated by reference in its entirety. A server program 40, 50, 60 offers a service which can be accessed by multiple users over the network. A program becomes a client 20 when it sends a message to a server and waits for a response from the server 40, 50, 60. The client process, which is typically optimized for user interaction, uses the requested service without having to know any of the detailed workings of the requested service or server. On the World Wide Web, "browsers" constitute client programs while the programs sending back information to the browser constitute server programs. As is conventional, a web server has an HTTP Daemon (HTTPD) running which is typically supported by an access agent which provides the hardware connections to machines on the intranet and access to the Internet, such as TCP/IP couplings. Examples of HTTPD are the IBM OS/2 Web Server or any other server having Hypertext Markup Language and Common Gateway Interface capability.

According to the present invention, a customer 10 locates an algorithm 55 from an algorithm supplier 50 (also called a method server), and a database 70 from a database supplier 60 (also called a content server). Then, the data analysis algorithm 55 is securely relocated to the database supplier 60 and run on the appropriate database 70 using an applet execution environment 75 (described later with reference to FIG. 5). The results of the search are displayed on a browser 20. Examples of such browsers are those sold by IBM under the trademark WebExplorer, and by Netscape under the trademark Netscape Navigator.

According to another aspect of the present invention, as the algorithm 55 runs, partial results are transmitted back to the customer 10. The customer 10 then decides whether to continue running the algorithm on the database (DB) 70. The customer 10 is also incrementally charged, each time the customer 10 requests that the algorithm 55 continue to run, the customer 10 is charged. An electronic commerce system 40 such as SET may be used for charging for the combined services and content access on the Internet. According to yet another aspect of the present invention, the charges are determined by a payment mechanism 85 (described later with reference to FIG. 6) at the database supplier.

According to still another aspect of the present invention, both the algorithm supplier 50 and the database supplier 60 are credited for running the algorithm. The amounts to be credited may be determined by the database supplier 60.

Those skilled in the art will appreciate that within the scope of the present invention a broker may act as an intermediary between the customer and the algorithm and database suppliers. Such a broker may locate suppliers and mediate the collection of partial results. A specific example of using a trusted third party to provide a description of an information product to potential buyers without disclosing the entire contents of the information products can be seen in the aforementioned co-pending patent application by Chess.

Figure 3:
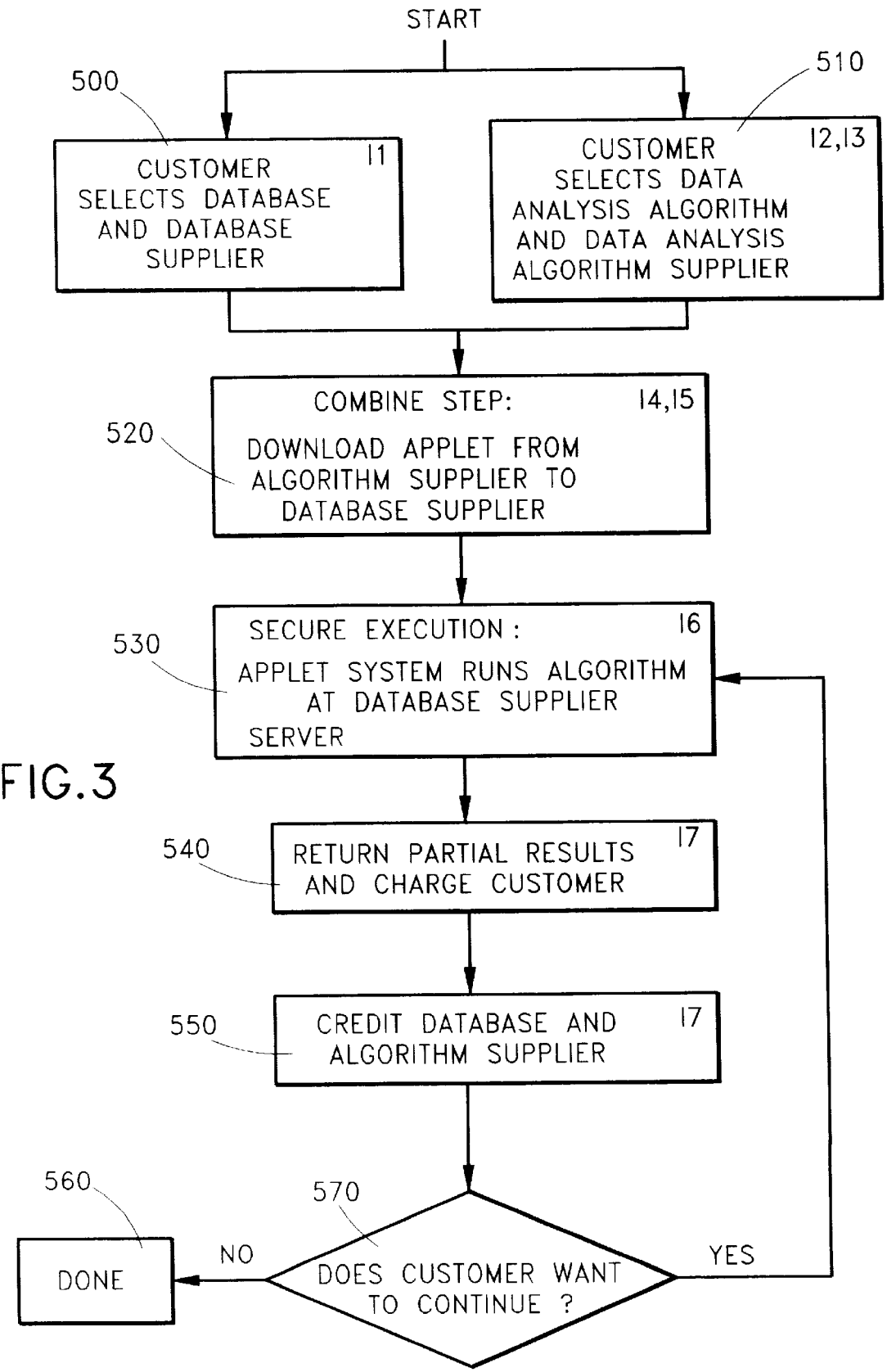
FIG. 3 shows a logic flow diagram of a computerized process in accordance with the present invention.

FIG. 3 depicts a logic flowchart of the interactions within the computer system shown in FIG. 2. A browser 20 is used to surf the Web and display information for the customer 10. As depicted, in step 500, the customer 10 locates the appropriate database 70. In step 510, the customer 10 selects a specific data-analysis algorithm. This may involve a web search or the customers 10 may already have the URL of the algorithm supplier 50 and/or database supplier 60. The algorithm supplier 50 may provide the minimum resource requirements (memory, disk,time) as a function of database size for the selected algorithm. The supplier may optionally provide a function that gives a time estimate for resources (memory, disk) greater than the minimum. The database supplier 60 may similarly specify the resources (memory, disk) available for Internet data-analysis and/or the size of the relevant database. In step 520, the customer 10 passes the algorithm name and URL of algorithm supplier 50 to the database supplier 60. The customer 10 may optionally specify that additional resources (memory, disk) be used rather than the minimum. The DB supplier 60 locates algorithm supplier 50 and downloads the appropriate data analysis algorithm. In a preferred embodiment, (described with reference to FIGS. 4 and 5) the data analysis algorithm is a downloadable code fragment such as a Java applet. Each downloadable code fragment is preferably verified to ensure that it conforms to the underlying execution environment 75. Alternatively, if the algorithm supplier 50 is trusted by the DB supplier 60, a binary of the algorithm may be downloaded to the DB supplier 60. In step 530, the downloadable code fragment 80 is then run at the execution environment at the database supplier 60. In step 550, the execution environment 75 enables multi threaded processes which can be constrained to communicate only with the selected database application. A thread in the database execution environment 75 may be used to support each customer 10 transaction. In step 540, the Database supplier 60 returns at least partial results to the customer 10. The customer 10 may be charged (discussed later with reference to FIG. 6) for each round of partial results. In a preferred embodiment, an electronic commerce model 40 such as SET is adopted to charge customers 10 and credit the database and data analysis algorithm suppliers 50, 60. In step 570, if the customer wants to continue, the process repeats at step 530. Otherwise, in step 560, the process ends.

Figure 4:
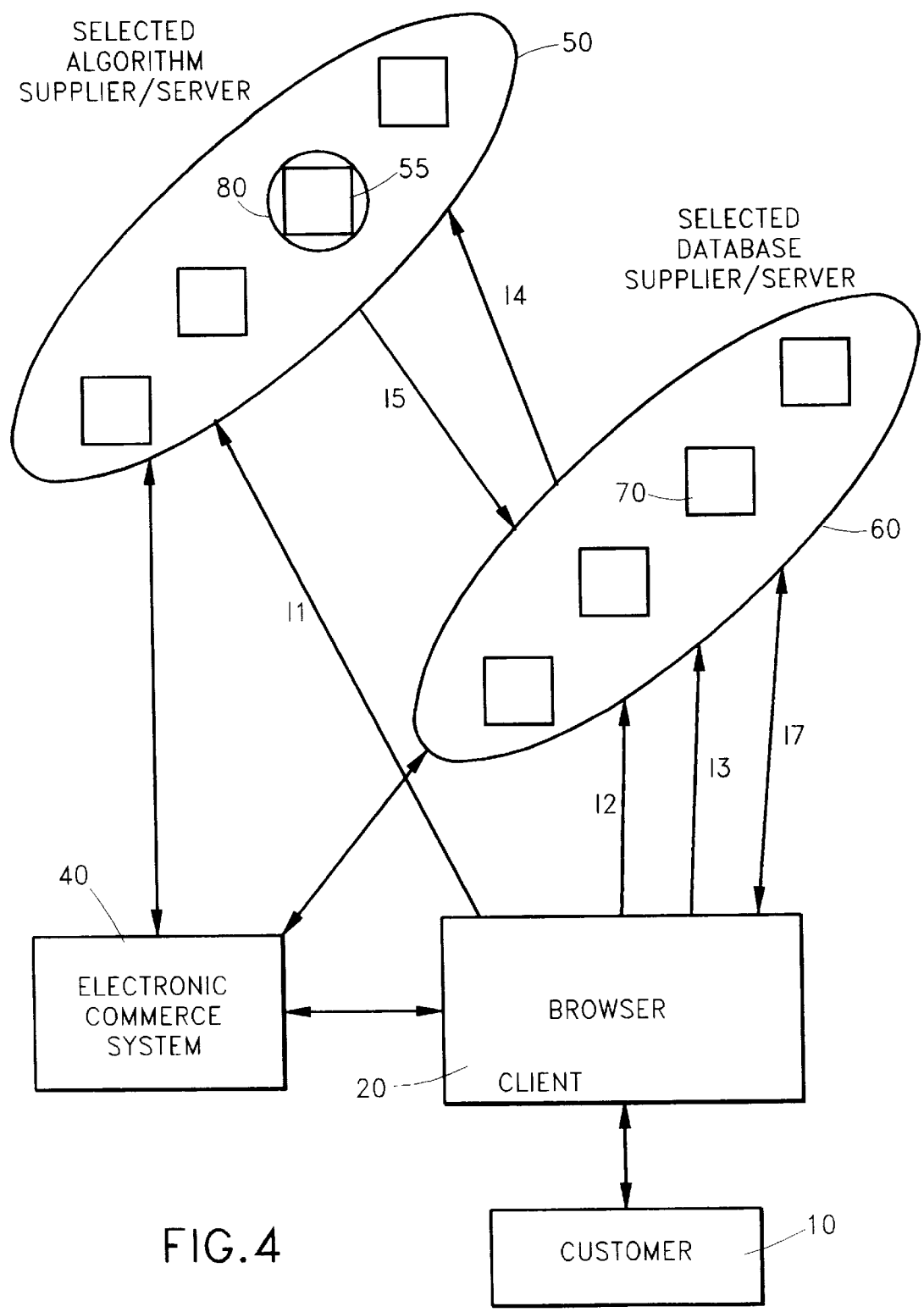
FIG. 4 shows a combined computer system and logic flow in accordance with the present invention.

FIG. 4 shows an example of a combined computer system and logic flow in accordance with the present invention. In this embodiment, the execution environment 75 comprises a Java virtual machine (described in more detail with reference to FIG. 5) and the downloadable code fragment is a Java applet. Java is a well known computer programming language, developed by Sun Microsystems, for the Internet. See, for example, "The Java Handbook," by Patrick Naughton, Osborne McGraw-Hill (1996). See also URL http://wwwjavasoft.com/java.sun.com/source.html. As depicted, pairs of components that interact are connected by directional lines I1 through I7 (uni-directional or bi-directional) indicating flow of data or control. There are seven interactions that take place between the various participants as enumerated below:

1. The customer 10 selects a specific data-analysis algorithm. This may involve a web search or the customers 10 may already have the URL of the algorithm supplier 50. The algorithm supplier 50 provides the minimum resource requirements (memory, disk, time) as a function of database size for the selected algorithm. The supplier may optionally provide a function that gives a time estimate for resources (memory, disk) greater than the minimum. A browser 20 is used to display the information for the customer 10.

2. The customer 10 locates the appropriate database. The customer can perform a web search or the customer may already have the URL for a database supplier 60. The database supplier 60 may also specify the resources (memory, disk) available for Internet data-analysis and the size of the relevant database.

3. The customer 10 passes the algorithm name and URL of algorithm supplier 50 to the database supplier 60. The customer 10 may optionally specify that additional resources (memory, disk) be used rather than the minimum.
4. The DB supplier 60 locates algorithm supplier 50.
5. The DB supplier 60 downloads the appropriate applet 80.
6. Each applet 80 is preferably first verified by the Java code verifier which ensures that the applet conforms to the underlying applet system. Second, the code's security credentials and resource constraints are validated using a modified Java code verifier. The aforementioned copending patent application by Anand et al., entitled "A Uniform Mechanism for Using Signed Content," which has been incorporated by reference, describes a mechanism for applets to access system resources in a controlled manner. This mechanism allows a Java Applet to access parts of the file system other than those specified statically using the CLASSPATH variable and allows applets to communicate with servers other than the one that the applet was downloaded from. This second verification step requires the use of the technology described in Anand et al. In this case, the present invention may stamp each applet with security and resource credentials that specify where the applet came from and what resources the applet will use. If the origins of the applet are trusted then so are the resource constraints. Java provides that the downloaded applet can either be compiled to run on the native machine's code or it may be interpreted. If the algorithm supplier 50 is trusted by the DB supplier 60, it can ship a binary of the algorithm to the DB supplier 60. The applet 80 is then run on the database supplier 60.

Java also provides a multi threaded programming paradigm. See, e.g., Naughton, pp. 181–199. The applet is preferably constrained to run so that it cannot communicate with applications besides the database. A system thread 100 in the database applet system may be used to support each customer 10 transaction.

7. The DB supplier 60 returns results (potentially partial results) to the customer 10. A pricing mechanism (discussed later) may be used to charge the customer 10 for each round of partial results.

Preferably, an electronic commerce model 40, such as SET, is adopted to charge customers 10 and credit the database and data analysis algorithm suppliers 50, 60.

Those skilled in the art will appreciate that the interactions can easily be changed so that customers 10 interact with the algorithm supplier 50 solely except to select the DB supplier 60. In this case, interaction 3 above is changed so that the customer 10 passes the database name and URL of the database supplier 60 to the algorithm supplier 50. Interaction 4 is changed so that the algorithm supplier 50 locates the database supplier 60. Also, interaction 5 may be changed so that the algorithm supplier 50 uploads the applet 80 to the database supplier 60. The only essential dependencies in the interactions above are as follows: Interactions 1 and 2 occur in any order but must occur before interaction 3. Interactions 3, 4, 5, 6, and 7 occur in that order. Interaction 7 may occur multiple times as partial results are returned to the customer 10 and the customer 10 is charged for the algorithm usage, database access, and partial results returned. Note that one or more of the logical participants given above may map to a single physical participant.

Those skilled in the art will also appreciate that this architecture is recursive in the following sense. The database supplier 60 may actually obtain its data by being the customer 10 that buys data analysis services over the Internet. Conversely, the customer 10 in FIG. 4 may turn around and be the database supplier 60 for another data analysis transaction with another group of participants. In other words, a participant that is a customer 10 in one transaction may be a supplier in another transaction.

A broker can also be added to act as an intermediary between the customer 10 and the other parties. The customer 10 interacts with the broker alone as a one-stop supplier. The broker interacts with the algorithm supplier 50 and database supplier 60 as described above (as if the broker were the customer 10 in FIG. 4).

The following protocols can be used to implement the interactions in FIG. 4. Interactions I1, I2, I3, and I7 may be implemented by using the HTTP protocol. Interactions I4 and I5 may be implemented using the Java downloading protocol. All interactions with the electronic commerce system may be implemented using the SET (see http://www.visa.com/cgi-bin/vee/sf/set/intro.html?2+0) protocol.

7.1 Preferred Embodiment

In our preferred embodiment the customer (user) 10 has access to the Netscape browser. At the customers request, the browser obtains a list of databases, data analysis algorithms and their suppliers from the Web via a standard search engine such as Yahoo!. As is conventional, the customer chooses a database 70 and a data analysis algorithm 55 by clicking on the appropriate images which are displayed on the browser using HTML.

The customer may input a maximum amount of money he would like to spent initially. Then the customer clicks the go button (representing a conventional hyperlink) to initiate the transaction. A request is sent to the database supplier 60 in the form of an http request. As is conventional, the database supplier has a http daemon (httpd) running that is Java enabled (see, e.g., Naughton, pp. 244–249).

Figure 5:
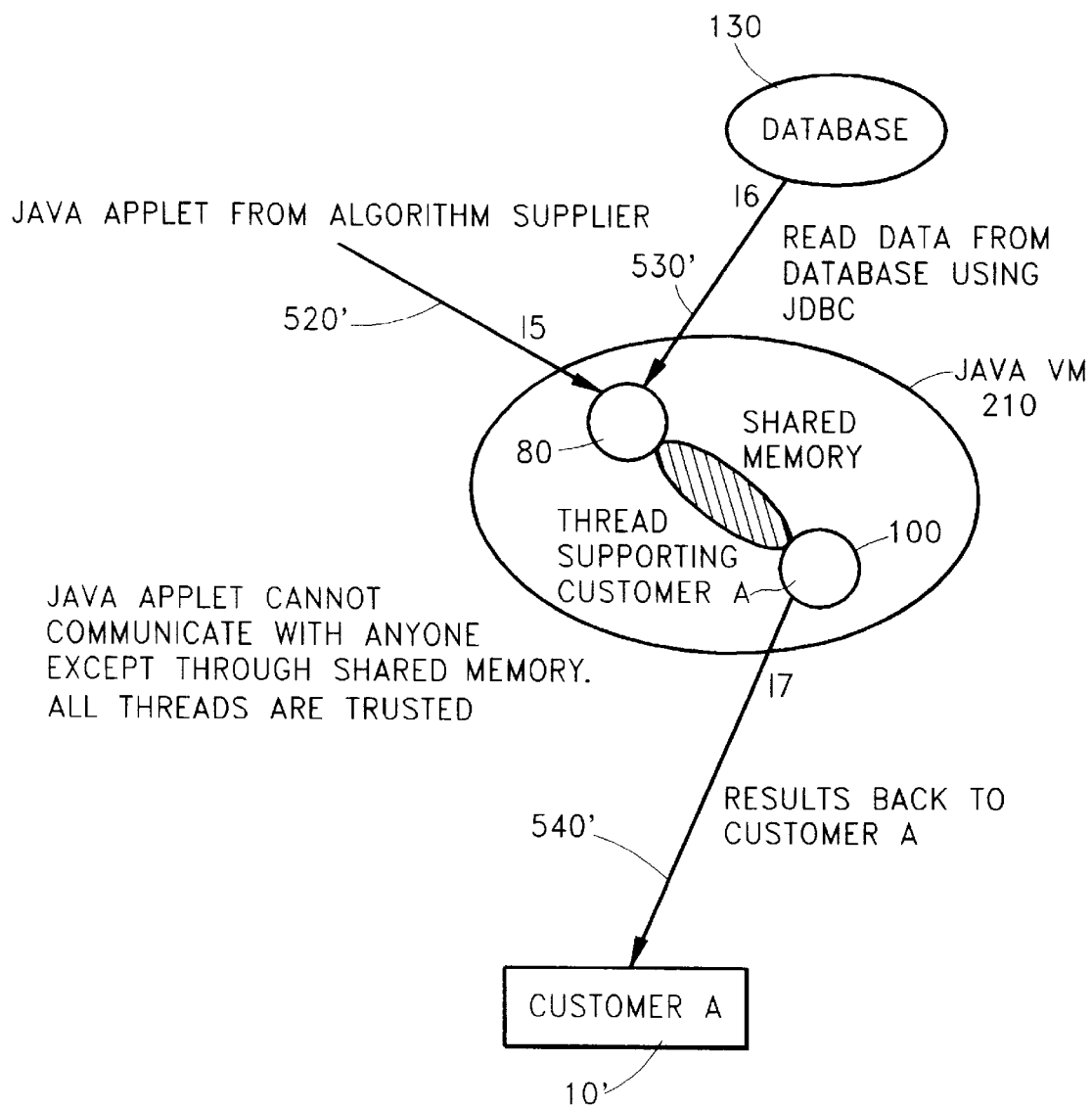
FIG. 5 shows a more detailed example of the execution environment of FIG. 2, in accordance with the present invention for securely executing the data analysis algorithm at the database supplier; and, FIG. 6 depicts a logic flow diagram for the payment mechanism of FIG. 2.

FIG. 5 shows a more detailed example of an execution environment 75 in accordance with the present invention for securely executing the data analysis algorithm at the database supplier. As depicted, the database supplier's http daemon communicates with the data analysis algorithm supplier through the Java language to download 520' the applet, using Java's internal protocol for downloading applets. The results are returned 540' to the customer using http and displayed using html. In our preferred embodiment we assume that the database supplier has the Java execution environment 210 running and that the Java on the database supplier is JDBC enabled 530'. JDBC is a well known and evolving Java application programming interface (API) to SQL databases. It is being developed by the JavaSoft division of Sun Microsystems. See URL http://splash.javasoft.com/jdbc/ for more details on JDBC. The JDBC library calls the database 130 using SQL. An exemplary database and database management system is that sold by IBM under the trademark "DB2".

The algorithm supplier 50 provides data analysis algorithms written as Java applets. The applets reside at the data analysis algorithm server 50. The chosen applet is downloaded to the database supplier and run.

Preferably, the applet runs in a thread which is constrained not to communicate outside the server it is running on. Java also provides a pool of system threads 100 that are constantly running (see http://www.javasoft.com/java.sun.com/source.html). According to one aspect of the present invention, a system thread 100 may be used to co-ordinate iterations with the customer 10'. When the Java applet containing the data analysis algorithm is downloaded, it registers itself with one of threads in the system thread pool. The downloaded applet communicates with the system thread 100 which in turn communicates 540' with the customer. These threads act as proxies which is similar to how the JAVA window system, Active Window Toolkit (AWT), is structured.

The system thread 100 communicates partial results to the customer, and determines whether or not the algorithm should continue executing after providing partial results to the customer. Thus, it may terminate the execution of the data analysis algorithm at any time. As is conventional, the data analysis algorithm may not write to local file storage or the data base.

Partial results are displayed on the browser 20. The actual display depends upon the content and the type of query. For example, a data analysis query to an image database could create a linked list of images, one per page.

The appropriate amount of money is subtracted from the customer's initial payment. If the customer presses a continue button, then the computation continues. Using the SET protocol, the customer requests some data analysis service in exchange for a payment of Y dollars. After the initial set of partial results, the customer either continues receiving results or terminates the transaction. The SET electronic commerce protocol allows a merchant to refund a customer partially after completing a payment transaction where a customer is charged for some product and the merchant is credited the same amount. If the transaction is terminated, the customer is credited the unspent money using the SET protocol. The database supplier and the algorithm supplier are credited with appropriate amounts.

If the electronic commerce protocol does not have a credit mechanism to make adjustments after the customer has paid for a transaction, the amount Y can be kept suitably low so that the customer does not lose too much.

7.2 Electronic Commerce Model

According to one aspect of the present invention, customers 10 pay for partial results interactively. They start by paying amount X, and then continue depending upon the partial results they receive. If the customer 10 wants to end the transaction at any time, the unspent money is returned to the customer 10. The SET commerce model 40 allows such a protocol to be implemented.

To determine the price of partial results, the DB may add the cost for the algorithm, the cost of data accessed from the DB, the cost of resources used (memory, disk, CPU cycles), and the cost of data transmitted to the customer 10.

The cost to the customer 10 is:

Customer_Price=(price_of_algorithm/unit-time)*time_used
+price_of_data_accessed_from_database
+price_of_resources_used
+price_of_data_sent_to_customer Different data in the database as well as different databases may have different prices associated with them. The price of data sent to the customer 10 may be a suitably large flat amount per bit. If the customer 10 supplies the data-analysis algorithm and tries to send back the entire database to the customer 10, the cost per bit approach acts as an inhibitor to such activity unless of course the customer 10 really wants the entire database. By charging appropriate prices, the DB supplier 60 can provide sufficient incentive for customers 10 to do data-analysis on the DB supplier 60 computer and collect some valuable summarized result as opposed to copying the entire database.

Figure 6:
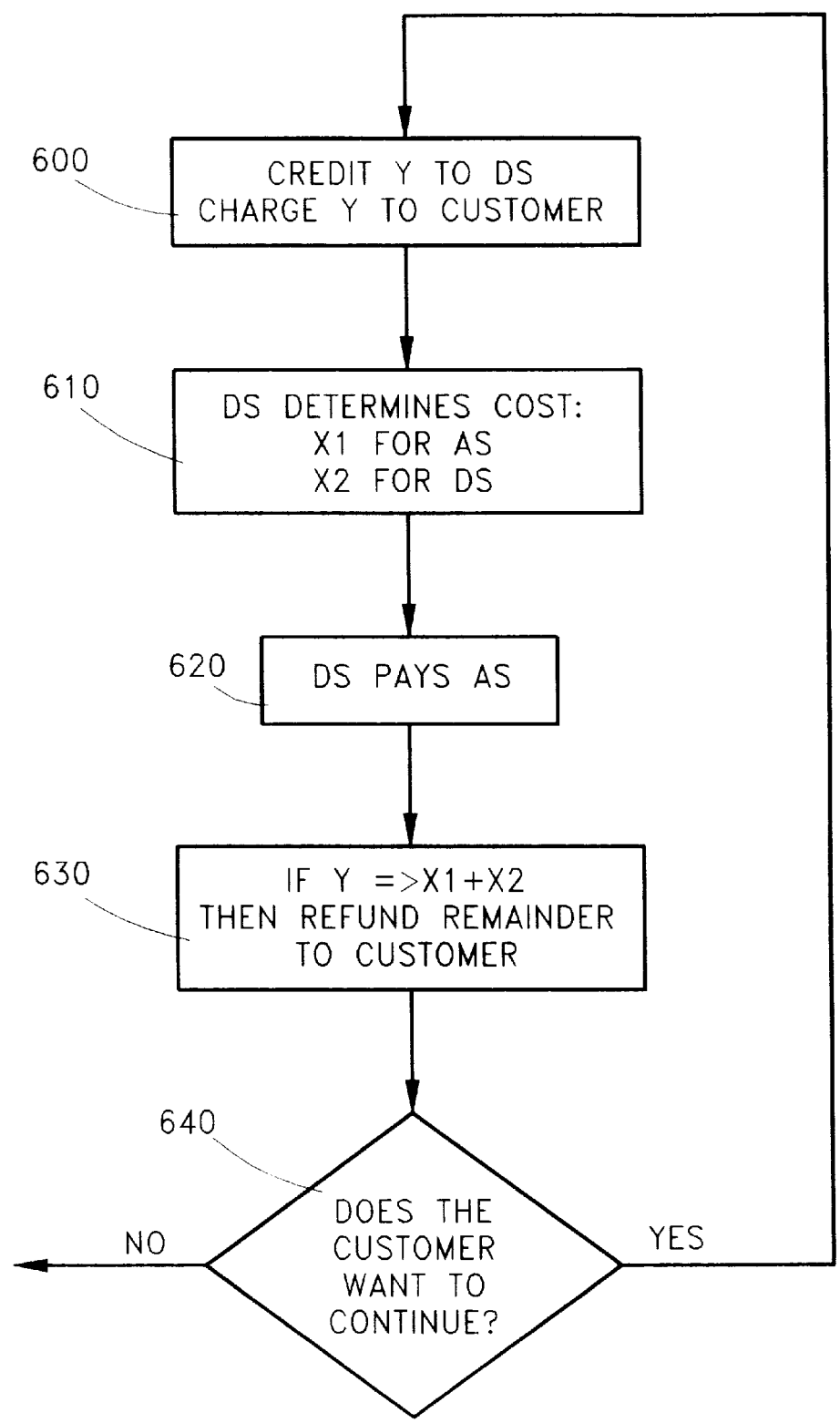

FIG. 6 depicts a logic flow chart for the payment mechanism of FIG. 2. The SET protocol or some other electronic commerce protocol may be used for the payment transactions. Before the data analysis algorithm is run at the database supplier, an initial amount Y is charged to the customer's account and the same amount is credited to the database supplier in step 600. After the data analysis algorithm has been run (to partial completion) so that the combined amount to be credited the database and algorithm suppliers is less than or equal to Y, partial results are returned to the customer and the database supplier computes the exact amounts X1 and X2 to be credited to the algorithm and database suppliers respectively in step 610. The database supplier pays the algorithm supplier the amount X1 in step 620. In step 630, the database supplier returns Y minus (X1+X2), the excess amount to the customer. In step 640, the database supplier finds out from the customer whether he or she wants to continue further with the data analysis algorithm execution. If yes, the previous steps are repeated. Otherwise, the payment transactions are done.

The roles of AS and DS are reversible in the payment transactions. If the roles are reversed, the DS must still compute the cost function in step 610 but the AS will return the results to the customer 10. As an optimization, the refunds may be returned to the customer 10 in one action rather than at the end of each iteration.

7.3 Who trusts whom

The Algorithm supplier 50 typically trusts the DB supplier 60 as does the customer 10 . The DB supplier 60 does not typically trust anyone. However, under special arrangements, the DB supplier 60 may trust an algorithm supplier 50. The meaning of trust is as follows. The AS trusts that the DS will compute and credit the AS with the correct amount. The customer 10 trusts that the DS will charge it fairly or according to a published fee schedule.

Each algorithm may be leased for a period of time (say by the hour, day, month, etc.) after which it self-destructs. Continued use of an algorithm by a DB is allowed by another transaction with the AS. A new instance of the algorithm is then loaded. Algorithms preferably can check-point and recover after partial result generation. The DB supplier 60 tells the Algorithm supplier 50 how long the algorithm was used.

8 ALTERNATIVE PREFERRED EMBODIMENTS

The JavaVM in all the figures could be substituted by ActiveX (a trademark of Microsoft Corp), and Windows95 (a trademark of Microsoft Corp).

The technology of the co-pending patent application by Anand et al., may be used to allow the downloaded applet to communicate with the customer without the use of the system thread 100. In this technology, the applet comes with resource requirements and security credentials as is described by Anand et al. Resource requirements include file access and a trusted Domain Name Server (DNS). Security credentials include digital signatures. The DNS is used to translate character string names to IP addresses which can then be used to communicate with entities other than the server from where the applet originated. The applet also comes with a list of files it wants to access. The modified Java verifier checks the validity of the trusted DNS and list of files to be accessed when the applet is loaded. An enforcement module ensures that the behavior of the applet conforms to the resource requirements and that the security credentials are not violated at runtime as is described in Anand et al. Preferably, the interactions labeled I1–I5 and I7 in FIG. 4 may be encrypted using the secure sockets layer protocol (ssl) (http://www.netscape.com).

Now that the present invention has been described by way of a preferred embodiment, with alternatives, various improvements will occur to those of skill in the art. Thus, it should be understood that the preferred embodiment has been provided as an example and not as a limitation. The scope of the invention is properly defined by the appended claims.

What is claimed is:

1. A computerized method for providing services over a communication network, comprising the steps of:
    sending a service provider selected by an end user from among a plurality of service providers on the network a message including an identifier of an independent content provider selected by the end user from among a plurality of content providers and an identifier of a particular service associated with the service provider, wherein said independent content provider is separate from said service provider;
    in response to the message, sending from the service provider to the content provider, a computer executable code which when executed by the content provider will cause the particular service to be performed against content controlled by the content provider;
    executing the computer executable code by the content provider; and,
    returning at least partial results of said executing step to the end user by way of the communication network.

2. The method of claim 1, wherein the computer executable code specifies one or more computing resources required, which include one of memory, disk space, and CPU time, for rendering the particular service.

3. The method of claim 1, wherein the computer executable code specifies one or more computing resources available, which include one of memory, and disk space, for rendering the particular service.

4. The method of claim 1, further comprising selecting from the at least partial results by the end user.

5. The method for claim 4, further comprising the steps of:
    in response to said selecting step, the end user communicating the message to the content provider; wherein said step of sending a service provider on the network a message is performed by the content provider, in response to the message communicated from the client.

6. The method of claim 4, further comprising the steps of:
    in response to said selecting step, the end user communicating the message to the service provider.

7. The method of claim 1, wherein said step of executing further comprises the step of constraining communications by the computer executable code to an application associated with the content executed against it.

8. The method of claim 1, wherein the network is the Internet and the service provider, content provider, and the end user are communicating with Java enabled machines and wherein the computer executable code is an applet.

9. The method of claim 1, further comprising the step of billing the end user based on one or more of the particular service, the content, a computing resource used, and the at least partial results, in response to said returning step.

10. The method of claim 9 further comprising the step of interactively billing the end user for partial results.

11. The method of claim 10, wherein said step of billing the end user for partial results interactively is implemented using an electronic commerce model.

12. The method of claim 11, further comprising the step of crediting the content provider for use of the content and the service provider for the use of the service.

13. The method of claim 1, wherein the service provider is a data analysis service provider, the content provider is an independent database provider, the service is a particular data analysis algorithm associated with the service provider, and the content is a database controlled by the database provider.

14. A computerized method for providing services over a communication network including the World Wide Web (WWW), said method comprising the steps of:
    sending an end user selected data analysis service provider on the network a message including an identifier of an independent database provider selected by the end user and an identifier of a particular data analysis algorithm associated with the service provider, wherein the data analysis service provider is selected by the end user from among a plurality of data analysis service providers, and wherein the independent database provider is selected by the end user from among a plurality of database providers;
    in response to the message, sending from the service provider to the database provider, an applet which when executed by the database provider will cause a query to be performed against the database controlled by the database provider, wherein said database provider is separate from said service provider;
    executing the applet by the database provider while constraining the applet to restrict communication to an application associated with the database; and,
    returning at least partial results of said executing step to the end user by way of the communication network.

15. The method of claim 14, further comprising the step of billing the end user based on one or more of the particular data analysis algorithm, database, a computing resource used, and the at least partial results, in response to said returning step; wherein the data analysis service provider, database provider, and the end user are communicating with Java enabled machines.

16. The method of claim 15 further comprising the step of billing the end user for partial results interactivity.

17. The method of claim 16, wherein said step of billing the end user for partial results interactively is implemented using an electronic commerce model.

18. The method of claim 17, further comprising the step of crediting the database provider for use of the content and the service provider for the use of the service.

19. A computer system for providing services over a communication network including a plurality of servers, the system comprising:
    a client coupled to the network and adapted for communicating requests from an end user;
    the client and the servers including a communication mechanism for sending a service provider selected by the end user from among a plurality of service providers on the network a message including an identifier of an independent content provider selected by the end user from among a plurality of content providers and an identifier of a particular service associated with the service provider, wherein said user selected independent content provider is separate from said service provider;
    the servers including a downloading mechanism for sending from the service provider to the content provider, a computer executable code which when executed by the content provider will cause the particular service to be performed against content controlled by the content provider, in response to the message;

an execution mechanism, coupled to the downloading mechanism, for executing the computer executable code by the content provider; and, means for returning at least partial results of said executing step to the end user by way of the communication network.

20. The system of claim 19, wherein the computer executable code specifies one or more computing resources required, which include one of memory, disk space, and CPU time, for rendering the particular service.

21. The system of claim 19, wherein the computer executable code specifies one or more computing resources available, which include one of memory, and disk space, for rendering the particular service.

22. The system of claim 19, wherein the client is further adapted for selecting by the end user, the particular service.

23. The system of claim 22, wherein the client is further adapted for communicating the message to the content provider; and the content provider is adapted for sending the service provider the message communicated from the client.

24. The system of claim 22, further comprising:

the client being adapted for communicating the message to the service provider; and the service provider being adapted for sending the computer executable code in response to the message communicated from the client.

25. The system of claim 19, wherein the execution mechanism is further adapted for constraining communication by the computer executable code to an application associated with the content executed against it.

26. The system of claim 19, wherein the network is the Internet and the service provider, content provider, and the client are communicating with Java enabled machines and wherein the computer executable code is an applet.

27. The system of claim 19, further comprising an electronic commerce system, coupled to the network, for interactively billing the end user based on the at least partial results.

28. The system of claim 27 further comprising a computerized payment means, coupled to the database supplier for determining a cost to the end user for the at least partial results.

29. The system of claim 28, wherein the cost for the partial results is based on one or more of the particular service, the content, a computing resource used, and the at least partial results.

30. The system of claim 29, further comprising means for crediting the content provider for use of the content and the service provider for the use of the service.

31. The system of claim 19, wherein the service provider is a data analysis service provider, the content provider is an independent database provider, the service is a particular data analysis algorithm associated with the service provider, and the content is a database controlled by the database provider.

32. A computer system for providing services over a communication network including the World Wide Web (WWW), said system comprising:

a client coupled to the network and adapted for communicating requests from an end user;

the client and the servers including a communications mechanism for sending a data analysis service provider selected by the end user from among a plurality of data analysis service providers on the network a message including an identifier of an independent database provider selected by the end user from among a plurality of database providers and an identifier of a particular data analysis algorithm associated with the data analysis service provider;

the servers including a downloading mechanism for sending from the service provider to the database provider, a downloadable code fragment which when executed by the database provider will cause a query to be performed against a database controlled by the database provider, wherein said database provider is separate from said service provider;

an execution mechanism for executing the downloadable code fragment against the database while constraining communications to an application associated with the database; and, means for returning at least partial results of said executing step to the end user by way of the communication network.

33. The system of claim 32, further comprising an electronic commerce system, coupled to the network, for interactively billing the end user based on the at least partial results.

34. The system of claim 33 further comprising a computerized payment means, coupled to the database supplier for determining a cost to the end user for the at least partial results.

35. The system of claim 34, wherein the cost for the partial results is based on one or more of the particular service, the content, a computing resource used, and the at least partial results.

36. The system of claim 35, further comprising means for crediting the database provider for use of the content and the service provider for the use of the service.

37. The system of claim 32, wherein the service provider, the database provider, and the client are communicating with Java enabled machines and wherein the downloadable code fragment is an applet.

38. The system of claim 37, wherein the execution environment at the database provider further comprises:

a multithreading mechanism; and, a shared memory wherein the applet runs in a thread which is constrained to communicate only through the shared memory.

39. The system of claim 37, wherein the means for returning at least partial results of said executing step to the end user by way of the communication network comprises a system thread, coupled to the applet, the system thread being adapted for communicating the partial results to the client.

40. The system of claim 37, wherein the means for returning at least partial results of said executing step to the end user by way of the communication network comprises a content delivery mechanism, coupled to the applet, for communicating the partial results to the client.

* * * * *